US012679569B2

(12) United States Patent
Takach, Jr.

(10) Patent No.: US 12,679,569 B2
(45) Date of Patent: Jul. 14, 2026

(54) DELIVERY SYSTEM WITH CHASSIS AND FLEXIBLE WRAP FOR AERIALLY DELIVERING ONE OR MORE PACKETS

(71) Applicant: Kairos Autonomi, Inc., Sandy, UT (US)

(72) Inventor: George A. Takach, Jr., Sandy, UT (US)

(73) Assignee: Kairos Autonomi, Inc., Sandy, UT (US)

( * ) Notice: Subject to any disclaimer, the term of this patent is extended or adjusted under 35 U.S.C. 154(b) by 0 days.

(21) Appl. No.: 18/972,042

(22) Filed: Dec. 6, 2024

(65) Prior Publication Data

US 2026/0138760 A1    May 21, 2026

Related U.S. Application Data

(60) Provisional application No. 63/606,893, filed on Dec. 6, 2023.

(51) Int. Cl.
*B64U 10/60* (2023.01)
*B64U 10/14* (2023.01)
*B64U 101/18* (2023.01)
(52) U.S. Cl.
CPC ............. *B64U 10/60* (2023.01); *B64U 10/14* (2023.01); *B64U 2101/18* (2023.01)

(58) Field of Classification Search
CPC ... B64D 1/12; B64D 1/22; B64D 1/08; B64D 1/04; B64D 1/02; B64D 9/00; B64D 25/06; B64F 1/32; B64U 2101/64; B64U 2101/67; B64U 2101/18; B64U 20/75
See application file for complete search history.

(56) References Cited

U.S. PATENT DOCUMENTS

| | | | | |
|---|---|---|---|---|
| 8,480,034 | B2 * | 7/2013 | Goddard .............. | B65D 77/062 |
| | | | | 169/53 |
| 11,485,614 | B2 * | 11/2022 | Tao ............................ | B66C 1/42 |
| 12,103,682 | B2 * | 10/2024 | Blake ........................ | B64D 1/12 |
| 12,479,576 | B2 * | 11/2025 | Anderson ................ | B64D 1/12 |
| 2022/0033081 | A1 * | 2/2022 | Kim ........................ | B64U 50/34 |
| 2025/0091715 | A1 * | 3/2025 | Johnson ................. | B64C 25/54 |
| 2025/0326546 | A1 * | 10/2025 | Peniche ............. | B65D 5/46016 |

* cited by examiner

*Primary Examiner* — Arfan Y. Sinaki
(74) *Attorney, Agent, or Firm* — Thorpe North & Western, LLP

(57) ABSTRACT

A delivery system for aerially delivering one or more packets includes a chassis, coupleable to or formed as part of an aerial vehicle capable of maneuvering the delivery system aerially. At least one flexible wrap is operable to at least partially encompass at least one packet to releasably retain the packet relative to the chassis. A release mechanism is carried by the chassis and a portion of the flexible wrap operably coupled to the release mechanism such that activation of the release mechanism causes the packet to unravel from the wrap to deploy the packet.

20 Claims, 6 Drawing Sheets

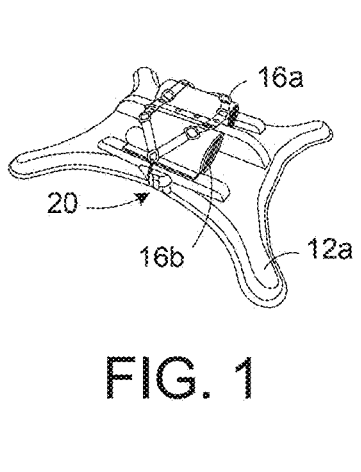
FIG. 1
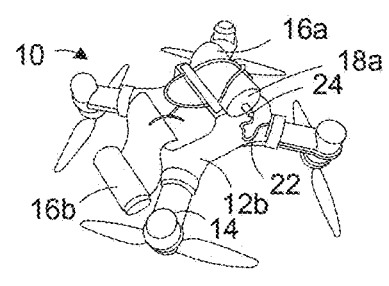
FIG. 2
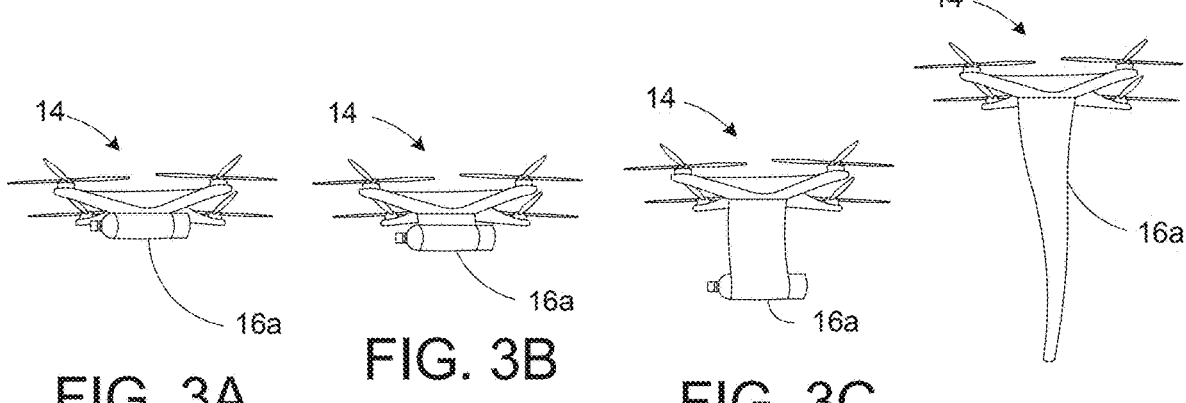
FIG. 3A     FIG. 3B     FIG. 3C     FIG. 3D
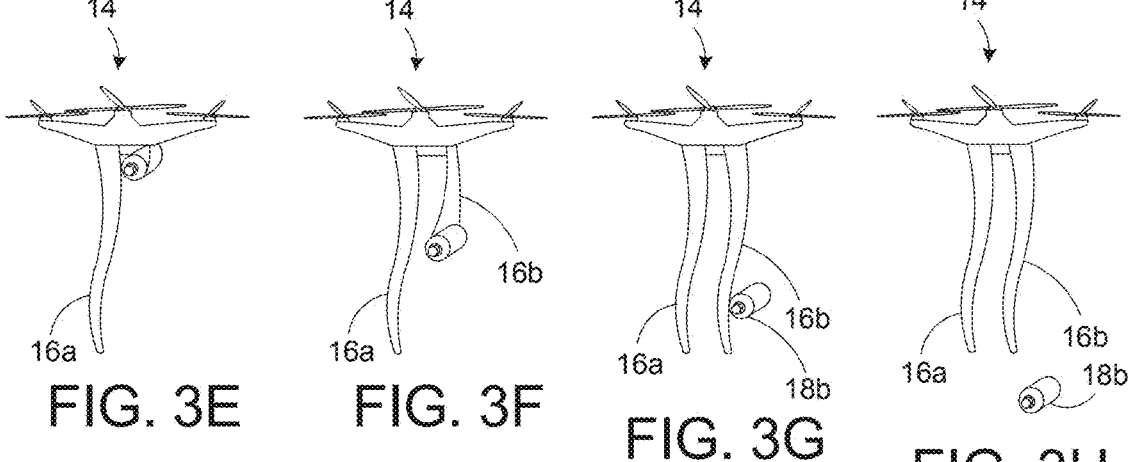
FIG. 3E     FIG. 3F     FIG. 3G     FIG. 3H

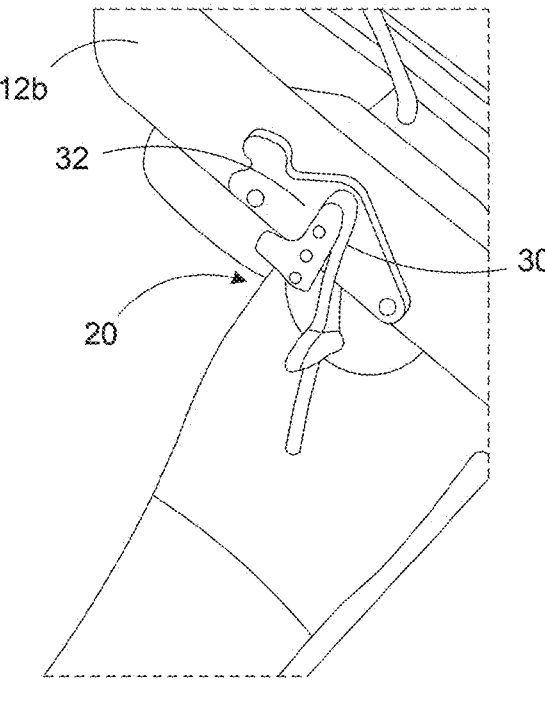
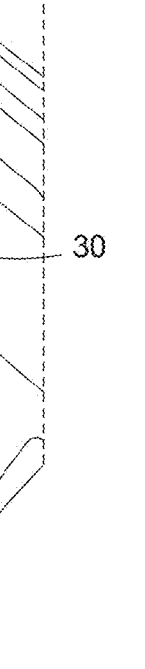
FIG. 4A
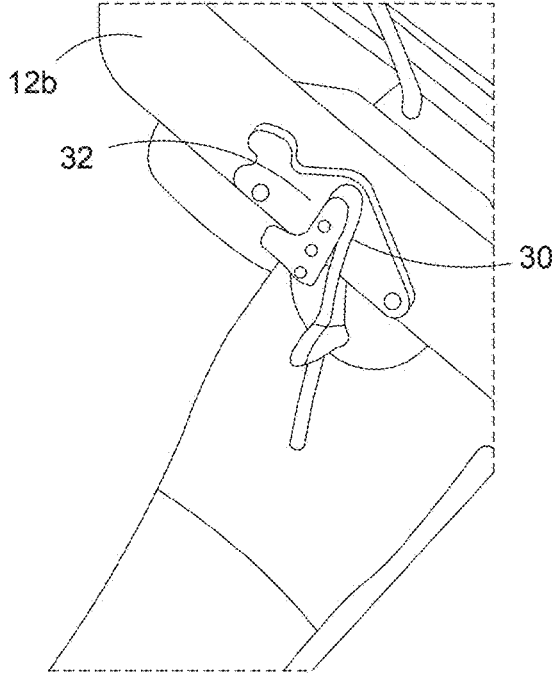
FIG. 4B
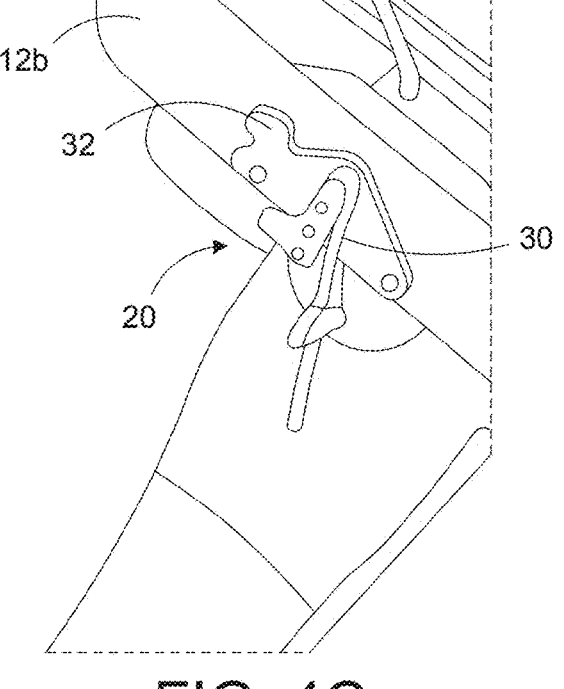
FIG. 4C
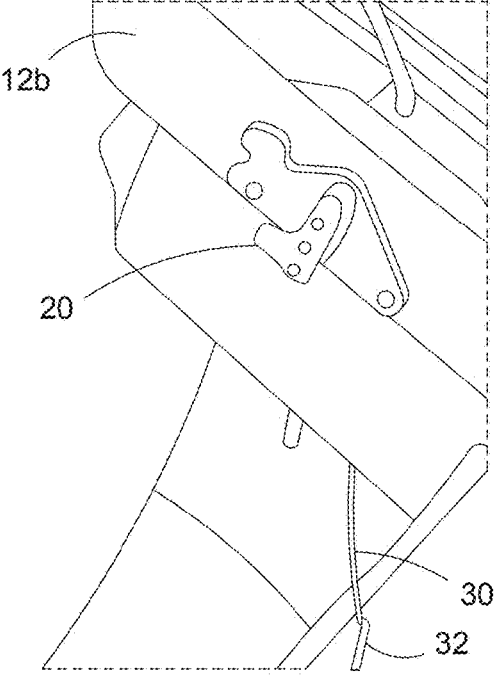
FIG. 4D

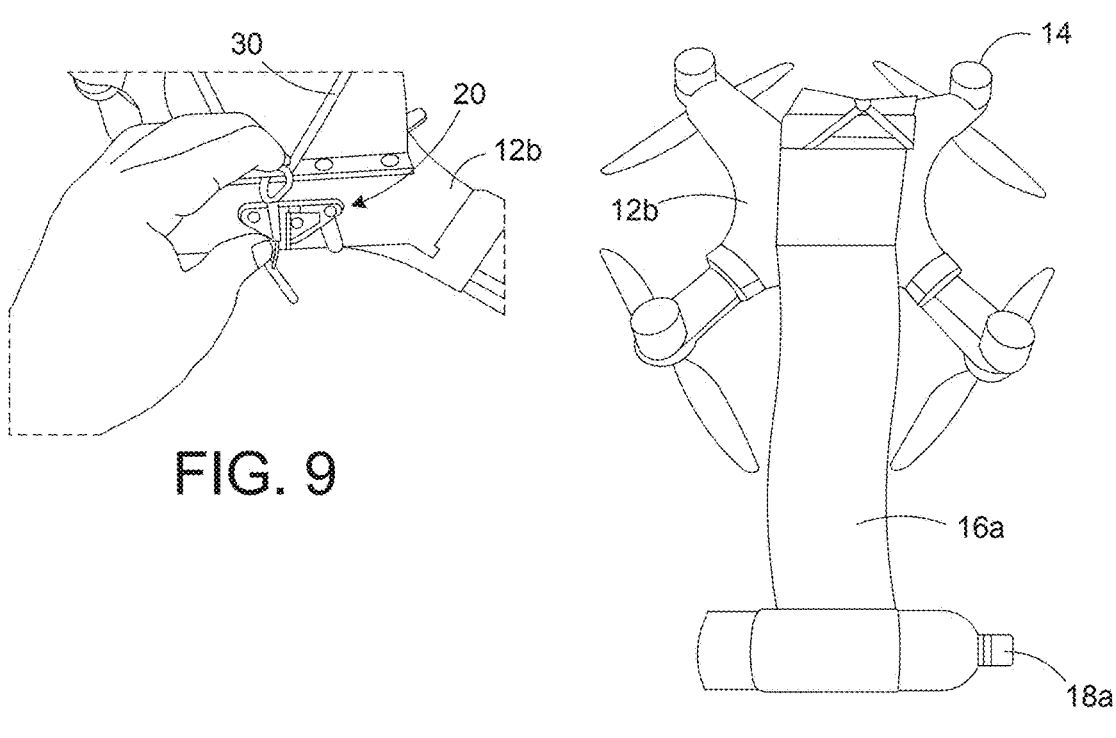
FIG. 9
FIG. 10
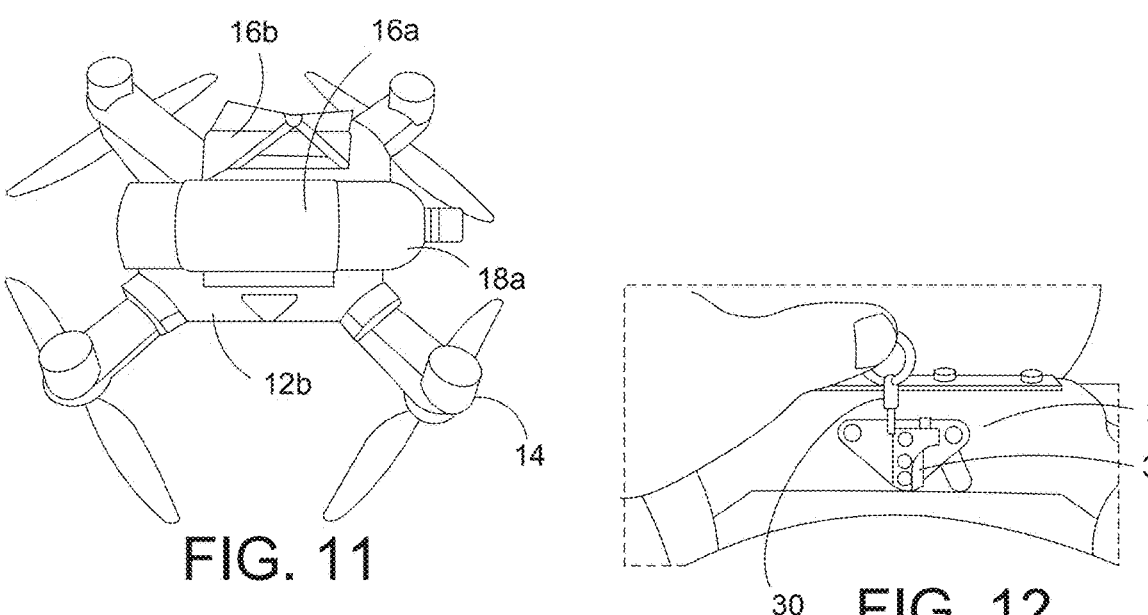
FIG. 11
FIG. 12

DELIVERY SYSTEM WITH CHASSIS AND FLEXIBLE WRAP FOR AERIALLY DELIVERING ONE OR MORE PACKETS

PRIORITY CLAIM

Priority is claimed of and to U.S. Provisional Patent Application Ser. No. 63/606,893, filed Dec. 6, 2023, which is hereby incorporated herein by reference in its entirety.

BACKGROUND OF THE INVENTION

Field of the Invention

The present invention relates generally to systems for aerially delivering packets.

SUMMARY OF THE INVENTION

In accordance with one aspect of the technology, a delivery system is provided for aerially delivering one or more packets. The system can include a chassis, coupleable to or formed as part of an aerial vehicle capable of maneuvering the delivery system aerially. At least one flexible wrap can be operable to at least partially encompass at least one packet to releasably retain the packet relative to the chassis. A release mechanism can be carried by the chassis. A portion of the flexible wrap can be operably coupled to the release mechanism such that activation of the release mechanism causes the packet to unravel from the wrap to deploy the packet.

In accordance with another aspect of the technology, a delivery system for aerially delivering one or more packets is provided. The delivery system can include a chassis, coupleable to or formed as part of an aerial vehicle capable of maneuvering the delivery system aerially. At least one stretchable and flexible wrap can be formed from cloth and can be operable to circumscribe in a plurality of layers at least one packet to releasably retain the packet relative to the chassis. A release mechanism can be carried by the chassis. A portion of the flexible wrap can be operably coupled to the release mechanism such that activation of the release mechanism causes the packet to unravel from the wrap to deploy the packet. The release mechanism can be remotely activatable. A tether can be coupled between the chassis and at least a portion of the packet, the tether operable to maintain connection between the chassis and the at least a portion of the packet after deployment of the packet. The packet can include a grenade and the at least a portion of the packet to which the tether is coupled can include a safety pin of the grenade.

There has thus been outlined, rather broadly, relatively important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1 is a perspective bottom view of a chassis in accordance with an embodiment of the technology;

FIG. 2 is a perspective bottom view of a chassis carried by aerial delivery vehicle in accordance with another embodiment of the technology;

FIGS. 3A through 3H are perspective views illustrating an aerial vehicle dropping a payload through successive frame shots;

FIGS. 4A through 4D are perspective views showing an exemplary release mechanism through successive frame shots;

FIG. 9 is a perspective, side view of the assembly of FIG. 6, showing a release mechanism in more detail;

FIG. 10 is a perspective view of an aerial delivery vehicle with a fabric dropper partially unrolled;

FIG. 11 is a perspective view of the vehicle of FIG. 11, with the fabric roll in a stored configuration;

FIG. 12 is a perspective, side view of the assembly of FIG. 6, showing a release mechanism in more detail;

DETAILED DESCRIPTION

Figure 5:
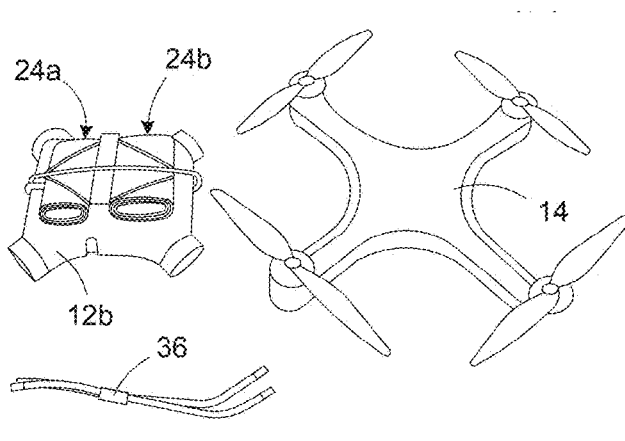
FIG. 5 is a perspective view of several components of an aerial delivery system in accordance with an embodiment of the technology.
Figure 6:
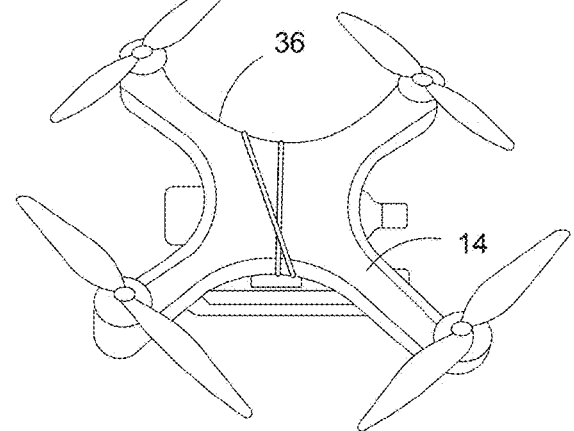
FIG. 6 is a perspective view of the components of FIG. 5 in an assembled condition.

Before the present invention is disclosed and described, it should be understood that this invention is not limited to the particular structures, process steps, or materials disclosed herein, but is extended to equivalents thereof as would be recognized by those of ordinarily skill in the relevant arts. It should also be understood that terminology employed herein is used for the purpose of describing particular embodiments only and is not intended to be limiting in any way.

It must be noted that, as used in this specification and the appended claims, the singular forms "a" and "the" include plural referents, unless the context clearly dictates otherwise. Thus, for example, reference to a "wrap" can, but does not necessarily, include one or more of such wraps.

Definitions

In describing and claiming the present invention, the following terminology will be used in accordance with the definitions set forth below.

As used herein, the term "substantially" refers to the complete or nearly complete extent or degree of an action, characteristic, property, state, structure, item, or result. The exact allowable degree of deviation from absolute completeness may in some cases depend upon the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

Distances, angles, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. This same principle applies to ranges reciting only one numerical value and should apply regardless of the breadth of the range or the characteristics being described.

The Invention

The present technology provides a low-cost, versatile, and simple solution for payload delivery on a variety of aerial platforms. The system described and claimed herein is alternately referenced herein as a dropper system or an aerial delivery system. The system can be readily adaptable to a variety of different payload types, for delivery of an array of munitions, logistical supplies, water bottles, tobacco rolls, grenades, smoke grenades, or other miscellaneous items. The system is lightweight, but still provides a safe method to deploy a variety of different payload types. While the present system can be utilized with any number of aerial vehicles, the discussion below will focus on use with unmanned aerial vehicles, such as drones, with the understanding that the technology is in no way limited to such vehicles.

The technology can provide a delivery system for aerially delivering one or more packets 18a, 18b, etc. The delivery system can include a chassis 12a, 12b, etc., coupleable to or formed as part of an aerial vehicle 14 capable of maneuvering the delivery system aerially. At least one flexible wrap 16a, 16b, etc., can be operable to at least partially encompass the at least one packet 18 to releasably retain the packet relative to the chassis. A release mechanism 20 can be carried by the chassis, and a portion of the flexible wrap 16 can be operably coupled to the release mechanism such that activation of the release mechanism causes the packet to unravel from the wrap to deploy the packet.

The flexible wrap 16 can be formed from a variety of materials, but in one aspect is formed from a cloth fabric. In one embodiment, the cloth fabric can be both flexible and elastic. The fabric can thus be positioned in both a first, relaxed configuration (which can be the unfurled position discussed in more detail below) and a second, stretched configuration, which can be the configuration shown, for example, in FIG. 2, where wrap 16a can be stretched and secured about payload or packet 18a.

While not so required, the wrap 16 can be of sufficient length to fully circumscribe the packet 18; that is, it can wrap fully about the packet. The wrap can also be configured with a length sufficient to circumscribe the packet in a plurality of layers. This can both ensure the wrap is securely attached in position relative to the chassis 12a, 12b, etc., during operation prior to deployment, while also ensure the wrap unfurls to a sufficient length below the chassis prior to the payload being released by the wrap. For example, the wrap can include a length of at least about 24 inches when unfurled.

As described in more detail herein, the payload or packet 18 can be a variety of items or devices, but in one aspect is a grenade or other munition, either a live munition or a simulation munition. The system 10 can also include a tether 22, coupled between the chassis 12 and at least a portion of the packet. The tether can be operable to maintain connection between the chassis and the at least a portion of the packet after deployment of the packet. This aspect of the technology can be advantageous when the packet includes a portion that is separable from the packet, for example, when the packet includes a grenade and the separable portion is a safety pin of the grenade. This arrangement is shown, for example, in FIG. 2, where tether 22 is attached to pin 24 (shown schematically). Thus, as the packet is dropped, gravity pulls the packet away from the chassis 12 (and vehicle 14), but the tether, which is secured to the vehicle and/or chassis, remains attached to the pin-thus resulting in the pin being pulled from or otherwise separated from the packet.

In most of the examples shown in the figures, the system 10 includes a plurality of (at least a first and a second) flexible wraps, each operable to at least partially encompass a second packet. In these examples, a second (or third, as required) release mechanism can also be provided. In this case, a portion of the second flexible wrap can be operably coupled to the second release mechanism such that activation of the second release mechanism causes the second packet to unravel from the second wrap to deploy the second packet.

In this manner, the two or more distinct release mechanisms 20 can be independently operable. Thus, a plurality of payloads or packets 18 can be carried by the system and controllably delivered to different locations, or where desired, the same location. The examples shown in FIGS. 3A through 3H illustrate deployment of two different payloads 18a, 18b, via two different wraps 16a, 16b. In the case where two packets are carried and deployed, the chassis 12 includes at least two depressions (24a, 24b in FIG. 5, for example) formed therein. Each depression can be operable to receive therein a packet or payload.

Figure 7:
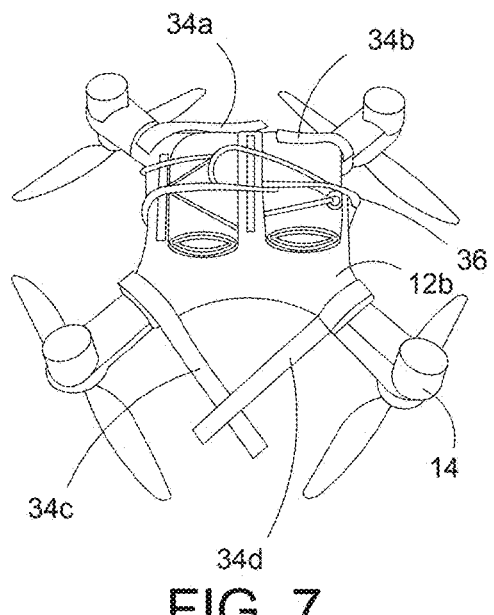
FIG. 7 is a perspective, bottom view of the assembly of FIG. 6.
Figure 8:
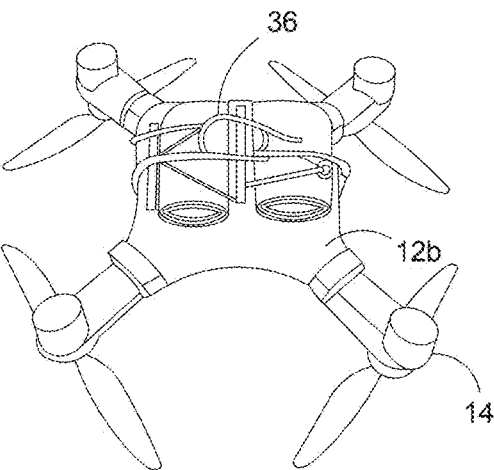
FIG. 8 is a perspective, bottom view of the assembly of FIG. 6.
Figure 13:
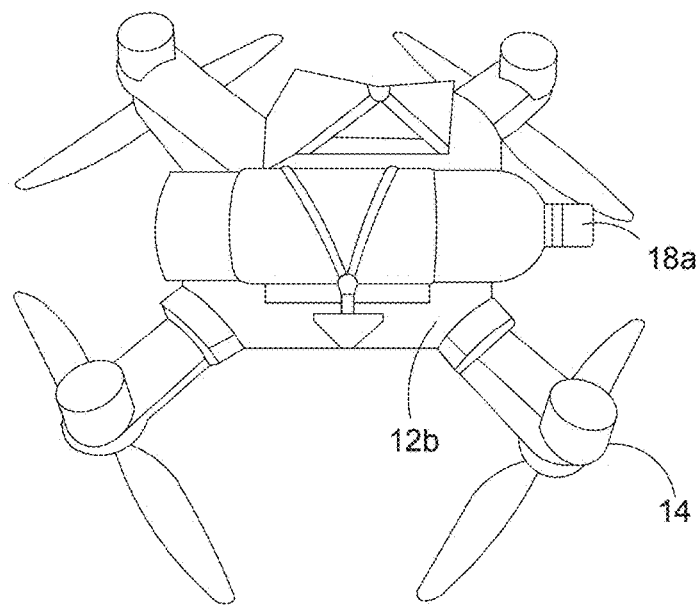
FIG. 13 is a perspective view of an aerial delivery vehicle carrying a single packet ready for deployment.

The chassis 12 can be coupleable to or formed integrally with the aerial vehicle 14. In the example shown in FIG. 5 and other figures, the chassis can be form-fittable about the aerial vehicle. FIG. 5 shows the chassis removed from the vehicle 14, while FIGS. 7 and 8 show the chassis installed atop the vehicle in a form-fitting manner.

FIGS. 4A through 4D, and 9 and 12 show more detail relating to the release mechanism. The release mechanism(s) can take a variety of forms, but generally hold or retain a portion of the wrap, or a component attached to the wrap, until it is desired to deploy the wrap. For example, a retaining strap 30 can be secured to the wrap and can extend to or include a pin 32 (see FIG. 9, for example). The release mechanism can releasably engage the pin 32 in a variety of manners, and can be remotely actuated (or, where desirable, actuated via a timer or similar device) to release the wrap and thereby deploy the packet or payload.

Figure 14:
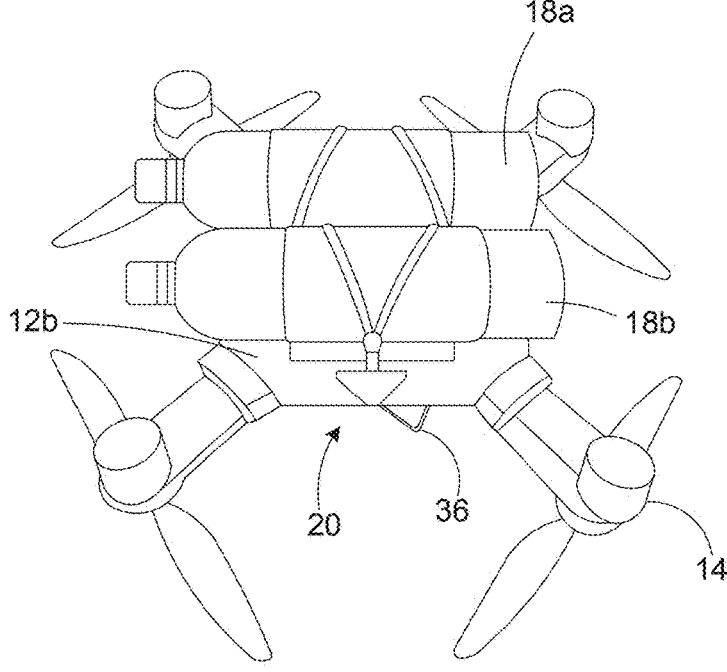
FIG. 14 is a perspective view of an aerial delivery vehicle carrying two packets ready for deployment.

FIG. 9 shows an operator installing the pin 32 in the release mechanism, and FIG. 12 shows the pin secured within the release mechanism. An electric coupler 36 (see FIG. 15, for example) can electrically couple the release mechanism to the circuitry of the vehicle and/or chassis. The release mechanism can retain or hold the pin 32 in a variety of manners, including without limitation by way of a physical clamp or clip that can be released with a servo-valve mechanism, or a magnetic interface or the like can also be utilized. FIG. 4A illustrate successive phases of the pin being released by the release mechanism, with FIG. 4A showing the pin firmly retained, and FIG. 4D showing the pin released from and displaced relative to the release mechanism. FIG. 14 is one view that shows the electrical coupler attached to the release mechanism (with an opposing end, not shown in this view, attached to the electronic controls of the device).

In one aspect, shown generally in FIGS. 1-4D, a low-cost chassis body can be formed from plastic and can include a form-fit shape that snugly interfaces with the shape of bodies of existing airframes. In one aspect, this can be fastened to the given aircraft with quick-release Velcro straps 34a, 34b, 34c, 34d, etc., or equivalent fasteners such as cables ties, etc. In one embodiment, two independent servo motors can control two different payload groups, allowing for dual drop per each sortie. A medium duty elastic band or flexible wrap can hold the given payloads in place during flight, which can each be flexible enough to allow for up to 3" diameter payloads to be carried by the dropper system.

The payload can be rolled up inside the payload bay fabric roll and fastened to the body of the dropper with a quick release pin. While in air over the target, the trigger servo can release the lock pin, allowing the payload to unfurl the fabric roll and drop towards the target.

In one case, the dropper weight can be about 1.2 lbs., with a capacity for items up to 3" in diameter. Reload time can be as low as one minute.

The system can include a commercially available Kairos™ trigger board (ethernet connection) or similar servo controller. Other electronic controllers, power sources, communication devices, etc., can be provided, including, in a non-limiting example, in control board 50 shown in FIG. 16.

FIGS. 3A through 3H show a condensed frame-by-frame of both fabric dropper payloads being deployed. Once the latching mechanism is released, the wrapped payload is allowed to drop, unfurling the fabric until the payload is fully released by the fabric and allowed to drop towards the target.

FIGS. 4A through 4D illustrate a condensed frame-by-frame exemplary release mechanism for the fabric dropper. When activated, the lock pin releases the catch pin, allowing the captured fabric roll to release and unfurl towards the target. Note that in most embodiments, once deployment has been achieved, the fabric remains unfurled, and can thereby serve as a visual indicator that the unit has deployed. In some embodiments, the fabric can be color-coded to identify which bay, or which type of payload, has been deployed.

Further embodiments are illustrated in FIGS. 5 through 15. These examples show exemplary installations and operations of a dropper system in accordance with the present technology. The dropper system can be a purpose-built applique kit designed to install quickly onto an existing aerial vehicle, for example, a mass-produced Hydronalix UAS system. Built-in servo outputs on the UAS can enable smooth interface and deployment of the dropper. In one example, the fabric dropper is installed onto a Hyronalix UAS according to the following: 1) Un-do the Velcro straps on the dropper body (FIGS. 7 and 8); 2) place the dropper onto the UAS, indexing the dropper using the on/off power switch on the outside of the UAS. Connect the dual-channel servo cable outputs (labelled) to the two different dropper servos. The opposite end of the cable will be connected to the Hydronalix UAS. An "Arm" and two "Fire" channels can interface with the UAS.

In one exemplary loading scenario, 1) the payload pin for the firing pin can be released (FIG. 9). After this, the payload can be loaded (wrapped) in the fabric sheet and roll it up inwards toward the body of the dropper (FIG. 10). The payload can be rolled up and placed into the payload bay (FIG. 11). The payload security strap can be pulled tight, after which the payload pin can be re-inserted into the firing channel (FIG. 12). When releasing manual grip of the payload pin, the wrap (held by the firing pin) will hold the payload pin in place during flight (FIG. 14). The process can be repeated on the opposite payload bay to load the second payload (FIG. 14). Once the Fabric Dropper payload has been secured, the UAS may now be deployed for dropping operations.

Figure 15:
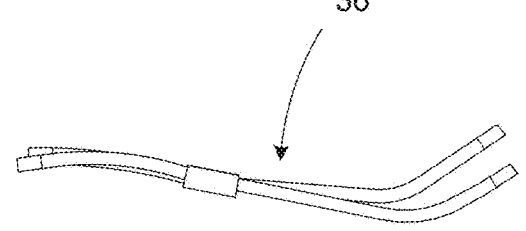
FIG. 15 is a perspective view of an electric coupler in accordance with an embodiment of the technology.

In one embodiment, the Hydronalix UAS system includes built-in servo output channels that allow the fabric dropper to be armed then independently fire both payload bays one at a time. The three servo channels used can be: Arm, Fire 1, Fire 2. These three channels interface with the dual-channel servo cable or electronic coupler 36 (FIG. 15). An active Arm channel (on or off) can activate the relay in the dual-channel servo cable and will enable firing of both the Fire 1 and Fire 2 channels. Exemplary RC outputs of all channels are listed below:

Arm channel, disarmed: 1000 micro seconds.
Arm channel, armed: 2000 micro seconds
Fire 1 channel, resting: 1580 micro seconds
Fire 1 channel, fired: 1000 micro seconds
Fire 2 channel, resting: 1580 micro seconds
Fire 2 channel, fired: 1000 micro seconds Note that for the fire channels, the microsecond count can affect the position of the firing pin servo. If the system stays within these bounds the firing pin will not become unseated from the dropper frame and will not need to be adjusted later.

FIGS. 16 through 19 illustrate further embodiments of the technology. As with other embodiments, in this approach to wholly US-based drone manufacturing, the present system is top of its class in manufacturability and manufacturing speed, and allows for rapid manufacture, rapid deployment, and firepower dominance on the battlefield. All of this is provided while being cost-effective and easily manufactured. The munition applique fabric dropper payload system allows an operator to deliver a wide variety of payload options on target. This system can transform any aerial vehicle into a platform for a wide range of use cases. Flight software can be provided that walks the line between autonomous and manned flight. In this manner, little attention is required to keep the aerial vehicle airborne and in position. Open-source GPS waypoint software can be used to enable even a novice user to successfully execute a send-and-return mission with critical accuracy.

Some Features of this embodiment can include:
Hover time exceeding 20 minutes (no payload)
Carries Payloads of 4+ pounds
Highly stable and precise position holds in 3D space.
Two stage Arming and Firing of any payload
Designed for simplicity and reliability.

Figure 16:
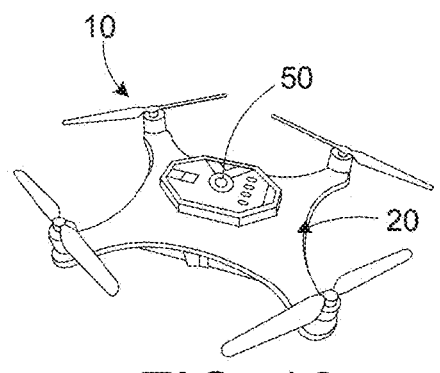
FIG. 16 is a perspective view of an aerial delivery vehicle showing control circuitry associated therewith.
Figure 17:
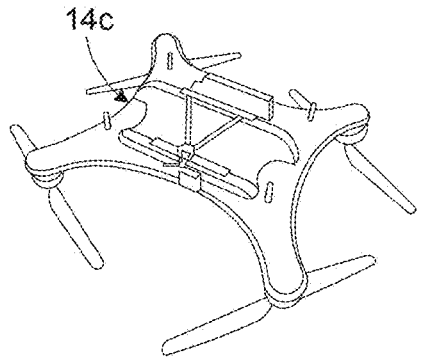
FIG. 17 is a perspective view of an aerial delivery vehicle having a chassis formed integrally with the vehicle.
Figure 18:
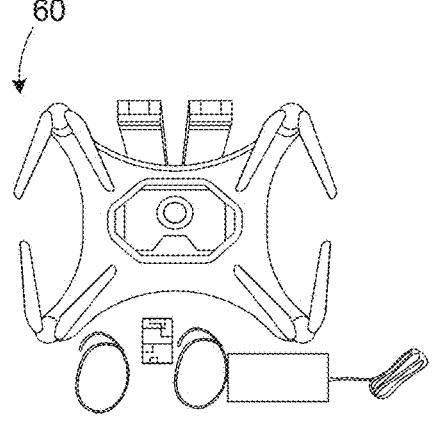
FIG. 18 is a top view of an exemplary accessory kit in accordance with an aspect of the technology.
Figure 19:
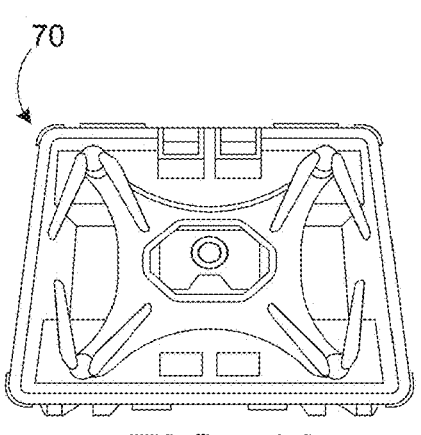
FIG. 19 illustrates an exemplary transportation case in accordance with an aspect of the technology.

FIG. 16 illustrates an exemplary drone motor with mounted prop. An exemplary battery/flight controller 50 is shown in FIG. 16. An exemplary integrated fabric dropper is shown in FIG. 17—in this case, the chassis is formed integrally with the vehicle. In FIG. 18, an exemplary accessory kit is shown at 60 with 2 batteries, charger, and Warder safety puck. In FIG. 19, an exemplary transportation case is shown at 70.

Some exemplary aircraft specifications are listed below:

| Exemplary Aircraft Specifications | |
| --- | --- |
| Length-No Props | 17 in./43 cm. |
| Width-No Props | 19 in./48 cm. |
| Height | 7 in./18 cm. |
| GNSS | GPS |
| Takeoff Weight-No Payload | 4.8 pounds/2.18 kg |
| Flight time-No Payload | 20 minutes |
| Max Payload | 4 pounds |
| Max Ascent Speed | 8.2 feet/s/250 cm/s |
| Max Horizontal Speed | 41 feet/s/1,250 cm/s |
| Power Supply | 2-3300 mAh 4 cell LiPo Battery (14-17 V) |
| Operational Radius | 1 mile/1.6 km |

| Exemplary Ground Control Station Specifications | |
| --- | --- |
| Model Name | Taranis QX7S |
| Radio Control Frequency | 2.4 Ghz |
| Range | 1 mile/1.6 km (Unobstructed, Little Interference) |
| Operating Temperatures | 14 F.-140 F./−10 C.-60 C. |
| Operating Voltages | 6.5-8.4 V (2 S LiPo Battery) |

In those embodiments in which the system is used to drop grenades or similar munitions, the grenade can be armed, that is the safety pin removed, after which instead of an operator maintaining pressure on the safety lever, the flexible wrap can maintain pressure on the safety lever. In this manner, the grenade can be armed while stowing in the flexible wrap. Then, once the dropper deploys the grenade, the safety lever is released. In addition, a separate tether can be carried by the chassis and connected to the safety pin of a grenade. As the dropper deploys the grenade, the safety pin will be pulled, thereby arming the grenade.

The wrap can be formed from a variety of flexible materials including, without limitation, cloth, mesh fabrics, metallic meshes and other suitable materials that can be wrapped about a payload and that will un-wrap in response to the gravitational pull on the payload.

It is to be understood that various wireless control systems, receivers, actuators, etc., are utilized by the present system but not explicitly disclosed herein. One of ordinary skill in the art, having possession of this disclosure, can readily adapt such known components for use with the present system.

In addition to the structural features outlined above, various methods are also provided that facilitate remote dropping of various payloads, remote dropping of live munitions, loading of payloads into an aerial vehicle, operation of aerial vehicles, and configuring, installing and removing such systems.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A delivery system for aerially delivering one or more packets, the system comprising:
    a chassis, coupleable to or formed as part of an aerial vehicle capable of maneuvering the delivery system aerially;
    at least one flexible wrap operable to at least partially encompass at least one packet to releasably retain the packet relative to the chassis; and
    a release mechanism, carried by the chassis, a portion of the flexible wrap operably coupled to the release mechanism such that activation of the release mechanism causes the packet to unravel from the wrap to deploy the packet.

2. The system of claim 1, wherein the flexible wrap is formed from cloth fabric.

3. The system of claim 2, wherein the cloth fabric is stretchable from a first, relaxed configuration into a second, stretched configuration.

4. The system of claim 1, wherein the flexible wrap is configured to fully circumscribe the packet.

5. The system of claim 4, wherein the flexible wrap is further configured to circumscribe the packet in a plurality of layers.

6. The system of claim 5, wherein the flexible wrap includes a length of at least about 24 inches when unfurled.

7. The system of claim 1, further comprising a tether, coupled between the chassis and at least a portion of the packet, the tether operable to maintain connection between the chassis and the at least a portion of the packet after deployment of the packet.

8. The system of claim 7, wherein the packet includes a grenade and wherein the at least a portion of the packet to which the tether is coupled includes a safety pin of the grenade.

9. The system of claim 1, further comprising a second flexible wrap operable to at least partially encompass a second packet; and
    a second release mechanism, a portion of the second flexible wrap operably coupled to the second release mechanism such that activation of the second release mechanism causes the second packet to unravel from the second wrap to deploy the second packet.

10. The system of claim 9, wherein the release mechanism and the second release mechanism are independently operable.

11. The system of claim 1, wherein the chassis includes at least two depressions formed therein, each depression operable to receive therein a packet.

12. The system of claim 1, wherein the chassis is coupleable to the aerial vehicle, and wherein the chassis is form-fittable around the aerial vehicle.

13. The system of claim 1, wherein the release mechanism is remotely activatable.

14. A delivery system for aerially delivering one or more packets, the system comprising:
    a chassis, coupleable to or formed as part of an aerial vehicle capable of maneuvering the delivery system aerially;

at least one stretchable and flexible wrap formed from cloth and operable to circumscribe in a plurality of layers at least one packet to releasably retain the packet relative to the chassis;

a release mechanism, carried by the chassis, a portion of the flexible wrap operably coupled to the release mechanism such that activation of the release mechanism causes the packet to unravel from the wrap to deploy the packet, the release mechanism being remotely activatable; and a tether, coupled between the chassis and at least a portion of the packet, the tether operable to maintain connection between the chassis and the at least a portion of the packet after deployment of the packet; wherein the packet includes a grenade and wherein the at least a portion of the packet to which the tether is coupled includes a safety pin of the grenade.

15. The system of claim 14, wherein the cloth fabric is stretchable from a first, relaxed configuration into a second, stretched configuration.

16. The system of claim 14, wherein the flexible wrap includes a length of at least 24 inches when unfurled.

17. The system of claim 14, further comprising a second flexible wrap operable to at least partially encompass a second packet; and a second release mechanism, a portion of the second flexible wrap operably coupled to the second release mechanism such that activation of the second release mechanism causes the second packet to unravel from the second wrap to deploy the second packet.

18. The system of claim 17, wherein the release mechanism and the second release mechanism are independently operable.

19. The system of claim 14, wherein the chassis includes at least two depressions formed therein, each depression operable to receive therein a packet.

20. The system of claim 14, wherein the chassis is coupleable to the aerial vehicle, and wherein the chassis is form-fittable around the aerial vehicle.

* * * * *